(12) United States Patent
Chung

(10) Patent No.: US 6,699,949 B2
(45) Date of Patent: Mar. 2, 2004

(54) PROCESS OF PREPARING MALEIC ANHYDRIDE MODIFIED POLYOLEFINS BY THE OXIDATION ADDUCTS OF BORANE AND MALEIC ANHYDRIDE

(75) Inventor: Tze-Chiang Chung, State College, PA (US)

(73) Assignee: Penn State Research Foundation, University Park, PA (US)

(*) Notice: Subject to any disclaimer, the term of this patent is extended or adjusted under 35 U.S.C. 154(b) by 45 days.

(21) Appl. No.: 10/156,946

(22) Filed: May 30, 2002

(65) Prior Publication Data

US 2002/0198327 A1 Dec. 26, 2002

Related U.S. Application Data

(60) Provisional application No. 60/293,977, filed on May 30, 2001.

(51) Int. Cl.$^7$ .......................... C08F 255/00; C08F 4/52
(52) U.S. Cl. ...................... 526/196; 526/197; 526/184; 525/251; 525/285; 525/284; 525/263; 525/64
(58) Field of Search ...................... 526/196, 197, 526/184; 525/251, 285, 284, 263, 69

(56) References Cited

U.S. PATENT DOCUMENTS

| | | | |
|---|---|---|---|
| 3,141,862 A | 7/1964 | Kirshenbaum | 525/251 |
| 3,476,727 A | 11/1969 | Monaco et al. | 526/65 |
| 4,167,616 A | 9/1979 | Bollinger | 526/197 |
| 4,174,358 A | 11/1979 | Epstein | 525/183 |
| 4,638,092 A | 1/1987 | Ritter | 568/1 |
| 5,286,800 A | 2/1994 | Chung et al. | 525/288 |
| 5,401,805 A | 3/1995 | Chung et al. | 525/288 |
| 5,976,652 A | 11/1999 | Krause et al. | 428/35.9 |
| 6,358,576 B1 | 3/2002 | Adur et al. | 428/34.2 |
| 6,391,456 B1 | 5/2002 | Krishnaswamy et al. | 428/411.1 |
| 6,515,088 B2 * | 2/2003 | Chung | 526/196 |

OTHER PUBLICATIONS

J. Thermoplastic Composite Materials 6, 18–28, W. Chinisirikul et al., 1993.
Eur. Polymer J., 19, 863–866, G. Ruggeri et al., 1983.
Macromolecules, 27, 26–31, 7533–7537, 1313–1319, Chung et al., 1994.
Polymer, 38, 1495–1502, Chung et al., 1997.
Macromolecules, 32, 2525–2533, Lu and Chung, 1999.
Macromolecules, 31, 5943–5946, Lu and Chung, 1998.
Macromolecules, 26, 3467–3471, Chung et al., 1993.
J. Polymer Sci., 26, 234–236, J. Furukawa et al., 1957.
J. Polymer Sci., 28, 227–229, J. Furukawa et al., 1958.
J. Polymer Sci., Part A–1, 4, 275–282, F. S. Arimoto, 1966.
J. Polymer Sci., 61, 243–252, F. J. Welch, 1962.
Macromolecules, 24, 3753–3759, S. Ramakrishnan, 1991.
J. Appl. Polym. Sci., 42, 609–620, J. Felix et al., 1991.
Polymer, 35, 1386–1398, B. Majumdar et al., 1994.
Comprehensive Polymer Science, First Supplement, Chap. 21 (Reactive Processing of Thermoplastic Polymers), 620–642, Allen G. Ed., Pergamon Press: NY, M. Lambla, 1982.
Eur. Polym. J., 30, 1047–1050, A. Priola et al., 1994.
J. Polym. Sci., Polym. Lett. Ed., 21, 23–30, Gaylord et al., 1983.
Macromolecules, 29, 1151–1157, W. Hinen et al., 1996.
J. Polym. Sci., Polym. Chem. Ed., 38, 1337–1343, B. Lu et al., 2000.

* cited by examiner

Primary Examiner—James J. Seidleck
Assistant Examiner—Olga Asinovsky
(74) Attorney, Agent, or Firm—Anthony J. DeLaurentis

(57) ABSTRACT

An in situ controlled oxidation reaction of trialkylborane ($BR_3$) in the presence of polyolefin and maleic anhydride produces mono-oxidized trialkylborane adducts, i.e., peroxyldialkylborane ($R—O—O—BR_2$), that can undergo homolytic cleavage to form ($R—O^*$ $^*O—BR_2$) and activate the polyolefin chain by alkoxyl radical ($R—O^*$) hydrogen-abstraction at ambient temperature. The formed polymeric radical ($C^*$), associated with the oxidized borane moiety ($^*O—BR_2$), then reacts with maleic anhydride by addition reaction, without side reactions, to form functional polyolefins that contain incorporated maleic anhydride side groups.

20 Claims, No Drawings

PROCESS OF PREPARING MALEIC ANHYDRIDE MODIFIED POLYOLEFINS BY THE OXIDATION ADDUCTS OF BORANE AND MALEIC ANHYDRIDE

RELATED APPLICATION

This application claims the benefit of U.S. Provisional Application No. 60/293,977, filed May 30, 2001, which is incorporated herein by reference.

FIELD OF THE INVENTION

This invention relates to a solution process for preparing maleic anhydride modified polyolefins with controllable polymer structure (high polymer molecular weight and desirable maleic anhydride content). More particularly, the present invention relates to a post-reactor process for grafting maleic anhydride molecules to a polyolefin chain with little or no side reactions that usually dramatically change polymer molecular weight and molecular weight distribution. The chemistry involves an in situ controlled oxidation reaction of trialkylborane ($BR_3$) in the presence of polyolefin (e.g., polyethylene (PE), polypropylene (PP), ethylene-propylene copolymer (EP), etc.) and maleic anhydride. Under certain reaction conditions, this process produces very desirable mono-oxidized trialkylborane adducts, i.e., peroxyldialkylborane (R—O—O—$BR_2$), that can undergo homolytic cleavage to form [R—O* *O—$BR_2$] and activate the saturated polyolefin chain by alkoxyl radical (R—O*) hydrogen-abstraction at ambient temperature. The formed polymeric radical (C*), associated with the oxidized borane moiety (*O—$BR_2$), then reacts with maleic anhydride by addition reaction without side reactions. The resulting functional polyolefins, which contain incorporated maleic anhydride side groups, are very effective interfacial materials for improving the interaction between polyolefins and other materials, such as glass fiber, nano-size clay particles, fillers, nylon, etc., in polyolefin blends and composites.

BACKGROUND OF THE INVENTION

Although useful in many commercial applications, polyolefins suffer a major deficiency in that they interact poorly with other materials. The inert nature of polyolefins significantly limits their end uses, particularly those in which adhesion, dyeability, paintability, or compatibility with other materials is paramount. Moreover, attempts to blend polyolefins with other polymers have been unsuccessful for much the same reason, i.e., the incompatibility of the polyolefins with the other polymers.

It has been demonstrated that addition of polar groups to polyolefin can improve the adhesion of polyolefin to many substrates, such as metals and glass (W. Chinisirikul et al, J. Thermoplastic Composite Materials 6, 18–28, 1993). In polymer blends, the incompatible polymers can be improved by adding a suitable compatibilizer that alters the morphology of these blends (U.S. Pat. No. 4,174,358). To be successful it is necessary to reduce the domain sizes for both of the polymers and to increase the interaction between domains.

In general, polyolefins have been the most difficult materials to chemical modify. In direct polymerization processes (in-reactor), it is difficult to incorporate functional group-containing monomers into polyolefins using the early transition metal catalysts (both Ziegler-Natta and Metallocene) because the functional groups tend to poison the catalysts. In post-reactor processes, the inert nature and crystallinity of the olefin polymers usually makes the material very difficult to chemically modify under mild reaction conditions. In many cases, post reaction modification of polyolefins, such as polyethylene and polypropylene, results in serious side reactions, such as crosslinking and degradation (G. Ruggeri et al, Eur. Polymer J. 19, 863–866, 1983). Accordingly, it is very challenging to develop a new chemistry that can prepare functionalized polyolefins having a controlled molecular structure.

In earlier work (U.S. Pat. Nos. 5,286,800 and 5,401,805), systematic investigations were made of borane-containing polyolefins that were prepared either by direct polymerization of organoborane-substituted monomers and α-olefins in Ziegler-Natta and metallocene polymerization processes or by hydroboration of the unsaturated polyolefins (Chung et al, Macromolecules 27, 26–31, 1994; Macromolecules 27, 7533–7537, 1994; Polymer 38, 1495–1502, 1997). The borane-containing polyolefins are very useful intermediates for preparing a series of functionalized polyolefins (Chung et al, Macromolecules 32, 2525–2533, 1999; Macromolecules 31, 5943–5946, 1998) and polyolefin graft copolymers, which showed very effective interfacial activity for improving polyolefin blends by reducing the domain sizes and increasing the interaction between domains. (Chung et al, Macromolecules 26, 3467–3471, 1993; Macromolecules, 27, 1313–1319, 1994).

An alternative route was described in U.S. Pat. No. 3,141,862. In that patent, graft copolymers were prepared via borane-containing polyolefin. The process was carried out by first treating a solid hydrocarbon polymer, in the presence of an inert organic diluent, with a boron alkyl ($BR_3$) and an oxygen-containing gas (e.g., air) at a temperature in the range of 20 to 150° C. The treated polymer was washed and then contacted with polar monomers (including 4-vinylpyridine and acrylonitrile) to form the graft copolymer. Apparently, the graft reaction was very inefficient, and all reactions required high concentration of organoborane and monomers to result in low yield graft copolymer and some homopolymers. Moreover, no information about the molecular structure of resulting copolymers was given. The estimated overall graft efficiency (graft density vs. borane) was very low (less than a few percent). Excess oxygen may cause over-oxidization of trialkylborane to form inactive bororate, borate, etc., as will be apparent from the discussion hereinbelow of the trialkylborane oxidation mechanism. Oxygen is also known to be a powerful inhibitor of free radical reactions by forming a relatively stable peroxyl radical. In addition, moisture in air can easily hydrolyze the oxidized borane moieties and prevent the graft reaction with the polymer.

In the prior art, it also has been disclosed that trialkyborane in an oxidized state becomes an initiator for the polymerization of vinyl monomers. (J. Furukawa et al, J. Polymer Sci., 26, 234–236, 1957; J. Polymer Sci. 28, 227–229, 1958; F. S. Arimoto, J. Polymer Sci.: Part A-1, 4, 275–282, 1966; F. J. Welch, J. Polymer Sci. 61, 243–252, 1962 and U.S. Pat. No. 3,476,727). The polymerization involves a free radical addition mechanism. A major advantage of using borane initiators is their ability to initiate the polymerization at low temperature. Traditional peroxides and azo initiators usually require considerable heat input to decompose and thereby to generate free radicals. Elevation of the temperature often causes significant reduction in molecular weight of a polymer accompanied by the loss of important properties of the polymer.

Despite the advantage of borane initiators, organoborane-initiated polymerizations tend to be unduly sensitive to the concentration of oxygen in the polymerization system. Too little or too much oxygen results in little or no polymerization. High oxygen concentration causes organoborane to be transformed rapidly to borinates, boronates and borates, which are poor initiators at low temperature. Moreover, polymerization is often inhibited by oxygen. To facilitate the formation of free radicals, some borane-containing oligomers and polymers were used as initiators in free radical polymerization reactions (See, e.g., U.S. Pat. Nos. 4,167,616 and 4,638,092). These organoboranes are prepared by the hydroboration of diene monomers or polymers or copolymers. Similar polymeric organoborane adducts, prepared by the hydroboration of 1,4-polybutadiene and 9-borabicyclo (3,3,1)-nonane (9-BBN), have been reported by S. Ramakrishnan in Macromolecules 24, 3753–3579, 1991. However, no information was provided about the application of organoborane-containing polyolefin polymers in the preparation of polyolefin graft copolymers.

Due to their unique combination of low cost, high activity and good processiblity, maleic anhydride (MA) modified polyolefins are, by far, the most important class of functionalized polyolefins in commercial applications. They are the general choice of material for improving compatibility, adhesion, and paintability of polyolefins. Among them, MA modified polypropylene (PP-MA) is the most investigated polymer and is used in applications, such as glass fiber reinforced PP (U.S. Pat. No. 6,391,456), anticorrosive coatings for metal pipes and containers (U.S. Pat. No. 5,976, 652), multilayer sheets of paper for chemical and food packaging (U.S. Pat. No. 6,358,576), and polymer blends (J. Felix et al., *J. Appl. Polym. Sci.* 42, 609–620, 1991; B. Majumdar et al., *Polymer* 35, 1386–1398, 1994).

PP-MA polymer was usually prepared by chemical modification of pre-formed PP under free radical conditions using thermally decomposed oraganic peroxides (M. Lambla, *Comprehensive Polymer Science, First Supplement, Chap. 21 (Reactive Processing of Thermoplastic Polymers)* 620–642, Allen, G. Ed., Pergamon Press: New York, 1982; A. Priola et al, *Eur. Polym. J.*, 30, 1047–1050, 1994). Due to the inert nature of the PP structure and poor control of the free radical reaction, this type of high temperature MA grafting reaction results in many undesirable side reactions, such as β-scission, chain transfer, and coupling (G. Ruggeri et al., *Eur. Polymer J.*, 19, 863–866, 1983). In addition to having a significant impurity content in the PP-MA product, having a yellowish-brown color, the MA incorporation in PP usually is inversely proportional to the resulting polymer molecular weight. Generally, it has been suggested that a significant portion of PP-MA polymers have a succinic anhydride group located at the polymer chain end, indicating polymer chain degradation, (Gaylord et al, *J. Polym. Sci., Polym. Lett. Ed*, 21, 23–30, 1983; W. Hinen et al., *Macromolecules*, 29, 1151–1157, 1996). In general, the inherent complexity of PP-MA molecular structure has significantly limited the understanding of its structure-property relationship, especially the ability of PP-MA to be used as an interfacial agent in PP blends and composites. However, it is well known that the high molecular weight is crucial for an effective interfacial agent.

In earlier work, it was reported that a new route for the preparation of maleic anhydride modified polypropylene (PP-MA) could be achieved by using a reactive PP intermediate containing several active p-methylstyrene units (B. Lu et al., *J. Polym. Sci., Polym. Chem. Ed.*, 38, 1337–1343, 2000) or borane units (b. Lu et al., *Macromolecules*, 31, 5943–5946, 1998 and 32, 2525–2533, 1999) that provide the reaction sites for selective maleic anhydride reactions. In the case of maleic anhydride terminated polypropylene (PP-t-MA), the chemistry involved hydroboration reaction of a chain-end unsaturated PP with dialkylborane (H-BR$_2$) to form borane terminated PP. The borane terminated PP was then interconverted to PP-t-MA under a controlled oxygen oxidation reaction and subsequent free radical graft-from reaction with maleic anhydride. No polymer molecular weight change was observed. The resulting PP-t-MA polymer, containing a chain end terminated MA group, was an effective compatibilizer in a PP/polyamide blend.

SUMMARY OF THE INVENTION

It is an object of the present invention to provide an improved process for preparing maleic anhydride grafted polyolefins.

It is another object to provide a process for preparing maleic anhydride modified polyolefins of controlled molecular weight and maleic anhydride content.

Yet another object is to provide a process for grafting maleic anhydride onto a polyolefin chain at ambient temperature and with little or no side reactions that can dramatically change the molecular weight and molecular weight distribution of the polymer being modified.

The above and other objects and advantages are accomplished in accordance with the present invention by providing an in situ controlled oxidation reaction of trialkylborane (BR$_3$) in the presence of polyolefin and maleic anhydride, whereby mono-oxidized trialkylborane adducts, i.e., peroxyldialkylborane (R—O—O—BR$_2$), that undergo homolytic cleavage to form (R—O* *O—BR$_2$) and activate the polyolefin chain by alkoxyl radical (R—O*) hydrogen-abstraction at ambient temperature, whereupon the formed polymeric radical (C*), associated with the oxidized borane moiety (*O—BR$_2$), reacts with maleic anhydride by addition reaction, without any side reactions, to form functional polyolefins that contain maleic anhydride side groups.

DESCRIPTION OF THE INVENTION

In this invention, a new maleic anhydride functionalization process has been disclosed, which involves a direct chemical modification of commercial polymers to produce maleic anhydride modified polyolefins with controlled molecular structure. The maleic anhydride modified polyolefin consists of a polyolefin backbone (PE, PP, ethylene-propylene copolymer (EP), etc.) and several succinic anhydride groups (residue of maleic anhydride molecules) chemically bonded along the polymer backbone.

The concentration of the incorporated maleic anhydride groups is from about 0.05 to about 5 mole % (vs. olefin units in the polymer chain), preferably from about 0.1 to about 3 mole %, mostly preferably from about 0.2 to about 1 mole %.

Suitable polyolefins to be modified include homo-, co- and terpolymers. Preferred polymers are those that are prepared by transition metal (Ziegler-Natta and metallocene catalysts) coordination polymerization of □-olefins, including $C_2$–$C_{18}$ monomers having linear, branched, cyclic, or aromatic vinyl structures. The preferred monomers include ethylene, propylene, 1-butene, 1-pentene, 3-methyl-1-butene, 4-methyl-1-pentene, 1-hexene, 1-octene, 1-decene, 1-dodecene, 1-tetradecene, 1-hexadecene, 1-octadecene and 1-eicosene. Preferred aromatic vinyl monomers include styrene and its derivatives (which may have substituents containing carbon, halogens, silicon and the like). Typical examples of the aromatic vinyl compounds that may be used include styrene, alkylstyrenes such as p-methylstyrene, o-methylstyrene, m-methylstyrene, 2,4-dimethylstyrene, 2,5-dimethylstyrene, 3,4-dimethylstyrene, 3,5-dimethylstyrene and p-t-butylstyrene, halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene, and vinylbiphenyls such as 4-vinylbiphenyl, 3-vinylbiphenyl and 2-vinylbiphenyl. Cyclic monomers that may be used preferably have 3 to 20 carbon atoms, and typical examples of such cyclic monomers include cyclopentene, cyclohexene, norbornene, 1-methylnorbornene, 5-methylnorbornene, 7-methylnorbornene, 5,6-dimethylnorbornene, 5,5,6-trimethylnorbornene, 5-ethylnorbornene, 5-propylnorbornene, 5-phenylnorbornene and 5-benzylnorbornene. In the present invention, the olefin monomers may be used singly or in a combination of two or more thereof.

The steric structure of the polyolefins to be modified can be anyone of the five types of tacticity known in polyolefins, including atactic, syndiotactic, isotactic, hemiisotactic and isotactic stereoblock. The steric structure of the polyolefins to be modified is very much controlled by the catalyst used to prepare the respective polyolefins.

The molecular weight of polyolefins to be modified generally is above 500 g/mole, and preferably is in the range of from about 10,000 to about 3,000,000 g/mole. Most preferably, the molecular weight of the polyolefin is from about 50,000 to about 1,000,000 g/mole.

The maleic anhydride functionalization chemistry of the present invention involves a post-reactor process using borane-maleic anhydride complex and in situ oxidation and graft-onto reaction of maleic anhydride molecules into polyolefin chain with little or no side reactions that can change the polymer molecular weight and molecular weight distribution. In other words, the polymer maintains its initial high molecular weight after being subjected to the maleic anhydride modification reaction.

Most particularly, the functionalization process in accordance with the present invention involves the pre-mixing of a borane compound, preferably a trialkylborane, and maleic anhydride in the presence of polyolefin that is usually suspended or dissolved in an inert organic solvent, including, but not limited to, $C_4$–$C_{15}$ linear alkanes, cycloalkanes, benzene and diphenyl. The trialkylborane forms an acid-base complex with maleic anhydride by interaction between B and O atoms at a temperature about 0 to about 150° C., preferably in the range of from about 10 to about 80° C., and most preferably from about 20 to about 70° C. This relatively stable complex significantly increase the control of the oxidation reaction to produce relatively uniform oxidation adducts. The formation of the acid-base complex may be illustrated, as follows:

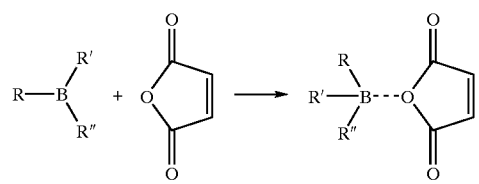

wherein R, R' and R" are the same or different, and may be linear, branched, cyclic, and aromatic alkyl groups. At least one of R, R' and R" is a linear or branched alkyl group, for example, methyl, ethyl, propyl, butyl, amyl, isoamyl, hexyl, isobutyl, heptyl, octyl, nonyl, decyl, cetyl, 2-ethylhexyl, etc.

Aromatic alkyl groups contemplated for use in the invention include $C_6$ to $C_{30}$ aryl radicals, such as, for example, phenyl and substituted phenyl radicals ($C_6H_{5-x}R'''_x$) having one to five substituent groups R''', wherein each substituent group R''', independently, is a radical selected from a group consisting of $C_{1-C4}$ hydrocarbyl radicals. ($C_6H_{5-x}R'''_x$) also may be a phenyl ring in which two adjacent R'''-groups are joined to form a five to eight-member saturated or unsaturated polycyclic phenyl group such as tetralin, indene, naphthalene, and fluorine. The mole ratio of trialkylborane and maleic anhydride is from about 1/1 to about 1/100, preferably from about 1/2 to about 1/50, and most preferably from about 1/5 to about 1/20.

In cases where symmetric trialkylborane ($BR_3$) compounds are used, such as when triethylborane, tributylborane, tri-isobutylborane, or the like are used as the trialkylborane, the oxidation mechanism of the trialkylborane by oxygen or other suitable oxidizing agent is very complicated due to the presence of three identical and equally reactive B—C bonds. In addition to the oxidation of multiple B—C bonds in each molecule, intermolecular reaction between an oxidized B—O—O—C bond and an unoxidized B—C bond can also take place as illustrated schematically below in connection with the use of tributylborane as the symmetric trialkylborane:

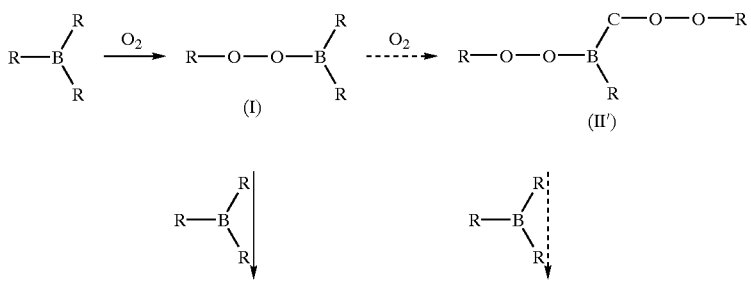

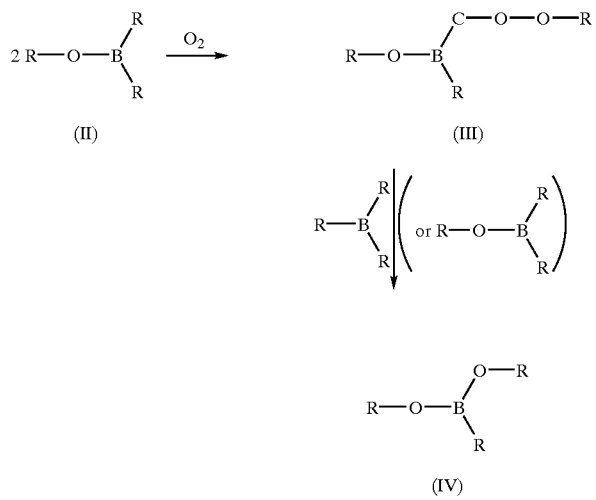

(II)      (III)

(IV)

After the first oxygen insertion into a tributylborane molecule, the formed R—O—O—BR$_2$ (I) can be oxidized further by oxygen to form (R—O—O—)(R—O—O—C—)BR (II'), or it can react with an unreacted BR$_3$ (facile reaction) to form two molecules of R—O—BR$_2$ (II), which is inactive in graft and polymerization reactions. The R—O—BR$_2$ compound can be oxidized further by oxygen to form an alkoxylperoxide (R—O—)(R—O—O—C—)BR (III), which, in turn, can react further with a B—R bond to form (R—O—)$_2$BR (IV). After this stage of the oxidation process, the concentration of unreacted BR$_3$ is significantly reduced, such that the intermolecular reaction becomes sluggish. An in situ $^{11}$B NMR measurement indicates that three major peaks are present. The three major peaks correspond to R—O—BR$_2$, (R—O—)(R—O—O—C—)BR, and (R—O—)$_2$BR. They are most visible during the oxidation process and progressively move toward the more oxidized and stable (R—O—)$_2$BR compound. In general, after two oxidation reactions for each tributylborane, the formed (R—O—)(R—O—O—C—)BR, and R—O—BR$_2$ compounds are relatively stable to oxygen (unless a large excess of oxygen is present).

It is very important to realize that the mono-oxidized adduct R—O—O—BR$_2$ (I) is the most reactive compound and that this compound is largely responsible for hydrogen-abstraction of polyolefin (PE, PP, etc.). Both alkoxide compounds, i.e., (R—O—) BR$_2$ (II) and (R—O—)$_2$BR (IV), are incapable of initiating graft reaction. Although (R—O—)(R—O—O—C—)BR (III) may be capable for some other reactions, it is too stable to react with inert polyolefin at ambient temperature. In the presence of polyolefin and maleic anhydride, the peroxyldialkylborane R—O—O—BR$_2$ (I) can cleave homolytically at the peroxyl bond to form (R—O* *O—BR$_2$) (V) and activate the saturated polyolefin chain by means of alkoxyl radical (R—O*) hydrogen-abstraction of a secondary proton in a PE chain and a tertiary proton in a PP chain, respectively, as illustrated below.

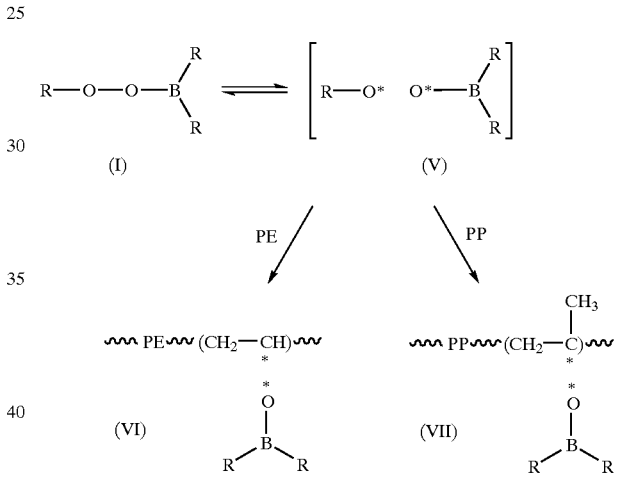

The formed polymeric radicals immediately associate with the oxidized borane moiety to form the protected species (C* *O—BR$_2$) (VI and VII), where C* denotes the polymeric carbon radical derived from the initial PE or PP. The protected species, (C* *O—BR$_2$) (VI and VII), are relatively stable, compared to the regular unprotected polymeric carbon radicals (C*), and are ready for reaction with maleic anhydride by addition reaction without side reactions. On the contrary, the regular unprotected polymeric carbon radicals (C*) are unstable and immediately engage in an undesirable free radical coupling reaction in cases where PE is the polymer being modified, and in an undesirable polymer chain scission reaction in cases where PP is the polymer being modified.

To optimize the grafting efficiency, the formation of R—O—O—BR$_2$ (I) and the reaction between R—O—O—BR$_2$ and the polymer chain have to be enhanced. In other words, it is very important to control the oxidation reaction so as to form the mono-oxidation product and to prevent intermolecular reaction between oxidized and unoxidized borane compounds. Favorable reaction conditions would be such as to maintain a high mole ratio of polymer repeating units/trialkylborane, and a low mole ratio of oxidizing agent/trialkylborane during the entire reaction process. The mole ratio of polymer repeating units/trialkylborane typically should be from about 10/1 to about 300/1, more preferably from about 30/1 to about 200/1, and most preferably from about 50/1 to about 150/1; whereas the mole ratio of oxidizing agent/trialkylborane generally should be from about 1/2 to about 4/3, preferably from about 9/10 to about 10/9, and most preferably about 1/1. It is preferable to add the trialkylborane and oxidizer to the reaction mixture in several small increments, so that the mole ratio of polymer repeating units/trialkylborane would continue to be high throughout the entire reaction process. Oxygen is the preferred oxidizing agent. However, other oxidizing agnets, such as organic peroxides and hydroperoxides may be employed. Non-limiting examples of suitable oxidizing agents include benzoyl peroxide, acetyl peroxide lauryl peroxide, t-butyl peracetate, cumyl peroxide, t-butyl peroxide, hyrdoperoxide and t-butyl hyrdoperoxide.

An alternative way to selectively achieve the desired mono-oxidized adduct R—O—O—BR$_2$ (I), i.e., controlling mono-oxidation reaction and preventing intermolecular reaction between borane species, is to use an asymetric trialkylborane, such as butyl-9-borabicyclononane (R-9-BBN), butyl-dimesitylborane (R—B(Mes)$_2$), or butyl-borafluorene (as illustrated below), in which only one B—R bond is most reactive and the other two B—C bonds are relatively stable in the oxidation reaction, due to a favorable double-chair form structure or strong B-aryl bonds.

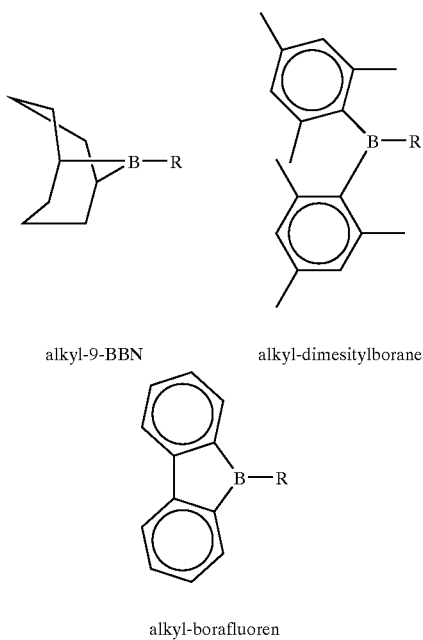

alkyl-9-BBN      alkyl-dimesitylborane alkyl-borafluoren

In situ $^{11}$B and $^1$H NMR measurements during the oxidation and graft reaction provide insight and quantitative information of reaction mechanism. In general, the asymmetric borane, containing a reactive linear alkyl C—B bond and two stable B—C bonds, undergoes selective oxidation in the first step of the oxidation reaction at the linear alkyl C—B bond to produce a mono-oxidized adduct, R—O—O—BR$_2$ (I), that is quite stable, thereby minimizing further oxidation reaction by oxygen. On the other hand, the intermolecular reaction between R—O—O—BR$_2$ (I) and the unoxidized trialkylborane is strongly dependent on the R group. In the case of dimesitylborane and butyl-borafluorene, no further intermolecular reaction was detected. The π-electron delocalization from aryl group to boron reduces the acidity of trialkylborane. However, in the case of butyl-9-BBN, a facile intermolecular reaction takes place to form two molecules of R—O—BR$_2$.

The entire trialkylborane oxidation and maleic anyhdride graft reaction process can be carried out at temperatures as low as about 0° C. However, the reaction kinetics are generally improved when the oxidation and graft reaction process is carried out at ambient temperatures (i.e., about 25° C.). Moreover, to further enhance the kinetics of the graft reaction with semicrystalline polymers (PE, PP, s-PS, etc.) in an inert reaction medium, it is beneficial to carry out the reaction at an elevated temperature (up to about 150° C.) to increase the solubility (or swellability) of the polymer in the reaction medium. Maleic anhydride (MA) is a very reactive reagent to the polymeric carbon radical (C*), however, it can not be homopolymerized to form a polymer chain. In other words, any polymer radical (C*) that is formed during the oxidation process will be captured by a MA molecule to form a succinic anhydride moiety.

In accordance with another embodiment of the present invention, the maleic anhydride grafted polyolefins are very effective interfacial materials for improving the interaction between polyolefins and other materials, such as glass fiber, nano-size clay particles, fillers, nylon, etc., in polyolefin blends and composites. The maleic anhydride grafted polyolefin serves as an emulsifier to alter the morphology of the polymer blends. More particularly, it may be used successfully to reduce the domain sizes for the polymers in the blend and to increase the interaction at the interface between the various domains. In polyolefin coating applications, this invention also provides a method for producing polyolefin-substrate laminate products, such as polypropylene-aluminum and polypropylene-glass with good adhesion at the interface. The maleic anhydride grafted polyolefin locates at the interface and provides the interface adhesion between the polyolefin and the substrate.

In the examples that follow, the MA units incorporated into polymer were determined by FTIR (Bio-Rad FTIR-60 spectrometer) using a polymer thin film (about 2 to 8 μm), which was prepared by compression-molding polymer powders between PTFE coated aluminum sheets at 190° C. and 25000 psi. The MA content was calculated from FTIR by the following equation: MA wt %=K(A$_{1780}$/d), where A$_{1780}$ is the absorbance of carbonyl group at 1780 cm$^{-1}$, d is the thickness (mm) of the film, K is a constant (=0.25) detected by calibration of the known MA content of MA grafted PP. Although, the correlation between the absorbance and MA content or film thickness may not be perfectly linear, especially for the samples with high MA contents, the general trends of this free radical MA grafting reaction are valid. The intrinsic viscosity of polymer was measured in a dilute decalin solution at 135° C. with a Cannon-Ubbelohde viscometer. The viscosity molecular weight was calculated by the Mark-Houwink equation: [π]=KM$^\alpha$, where for PP, K=1.05×10$^{-4}$ dl/g and α=0.80; and for PE, K=6.2×10$^{-4}$ dl/g and α=0.70. The melting point of the polymer was measured under nitrogen by differential scanning calorimetry (Perkin-Elmer DSC-7) with a rate of 20° C./min.

The following examples are illustrative of the invention.

EXAMPLE 1

$^1$H and $^{11}$B NMR Study of Oxidation Adducts of Tributylborane (TBB)

The in situ $^1$H and $^{11}$B NMR study of trialkylborane oxidation was carried out in two quartz NMR tubes, containing (a) tributylborane (0.1 M) in benzene and (b) a-PP and TBB (25 mole % of monomer units) in benzene under nitrogen. To both tubes, a controlled amount of $O_2$ (vs. TBB) was slowly injected into the tubes through septum, and the $^1H$ and $^{11}B$ NMR spectra were recorded in a Bruker AM 300 instrument. Overall, the oxidation reactions of tributylborane were similar and very effective in both conditions, with and without a-PP polymer. With $TBB/O_2=1/1$ mole ratio, $^{11}B$ NMR spectra showed the chemical shift at 86 ppm ($BR_3$) almost disappeared and three new peaks, including a major peak at 58 ppm corresponding to mono-oxidized species (O—$BR_2$) (I) and two minor peaks at 35 and 33 ppm for two types double oxidized O—BR—O species (II') and (III). Because of the stoichiometric ratio between borane and $O_2$, most of B—O bonds were B—O—O—R moieties. By increasing the oxygen concentration to $TBB/O_2=1/2$, the double oxidized O—BR—O species became the major product and the B(—O)$_3$ species became a minor product. In addition, a clean oxidized alkyl group ($CH_2$—O) also was observed in the $^1H$ NMR spectrum of sample (a), with a single triplet peak at 3.7 ppm. On the other hand, many alkoxide peaks (3.6–4.3 ppm) were observed in sample (b)—the oxidation adducts of TBB with a-PP—which implies some reaction happened on a-PP.

EXAMPLE 2

Model Compound Study: Maleation Reaction of Atactic Polypropylene

In a 100 ml flask equipped with a stirrer, 10 g of atactic polypropylene (a-PP) having a molecular weight (Mv) of 15,000 g/mole was completely dissolved in benzene at ambient temperature under nitrogen, followed by the addition of 2.5 g maleic anhydride (MA) and 1.1 g tributylborane (TBB). After stirring the mixture for 10 minutes, 390 ml of oxygen was introduced into the flask over a period of 3 hours. The resulting mixture was stirred for another 3 hours at 25° C. and then added to a flask containing 200 ml of acetone to precipitate maleic anhydride modified a-PP polymer. The resulting modified polymer was isolated by filtration, washed with acetone four times, and dried under vacuum at 50° C. for 24 hr. FTIR spectrum indicated that the maleic anhydride modified a-PP polymer contained 1.1 weight % of maleic anhydride units. The intrinsic viscosity of a-PP-MA indicated no change in polymer molecular weight before and after modification. Accordingly, it is evident that the MA graft reaction took place even at ambient temperature (25° C.), and that the rate of the reaction was controlled predominately by kinetic diffusion.

EXAMPLE 3

Model Compound Study: Maleation Reaction of Atactic Polypropylene

In this example, the focus was on understanding the borane species involved in the MA-PP chain graft reaction. The reaction followed the procedures of Example 2, except that an already mono-oxidized trialkylborane, i.e., methoxydiethylborane (MODEB), was used as the oxidation agent to form peroxide, instead of using a tributylborane (TBB). About 10 g of atactic polypropylene (a-PP) having a molecular weight (M) of 15,000 g/mole was dissolved in benzene at ambient temperature under nitrogen, followed by the addition of 2.5 g maleic anhydride (MA) and 0.6 g methoxydiethylborane [$CH_3$—O—B($C_2H_5$)$_2$]. After stirring the mixture for 10 minutes, 390 ml of oxygen was introduced into the flask over a period of 3 hours. The reaction mixture was stirred for another 3 hours at 25° C. before precipitating the reaction mixture in 200 ml acetone. The resulting polymer was isolated by filtration, washed with acetone four times, and dried under vacuum at 50° C. for 24 hours. FTIR spectrum showed no maleic anhydride units in the treated a-PP polymer chain. Apparently, the oxidation adducts of MODEB, including the double oxidized [$CH_3$—O—B(O—O—$C_2H_5$)($C_2H_5$)] species, which was the major species, failed to react with the PP chain. In other words, the reactive species in the MA graft reaction in Example 2 was the mono-oxidized trialkylborane species, i.e. peroxyldialkylborane (R—O—O—$BR_2$), which reacted with the PP chain by proton-extraction to the form polymeric radical illustrated in the specification hereinabove.

EXAMPLE 4

Maleation Reaction of Commercial Isotactic Polypropylene (Pellet-form)

A commercial pellet-form isotactic polypropylene (i-PP) having a viscosity molecular weight (Mv) of 270,000 g/mole and a melting temperature of 162° C. was purified by dissolving the polymer pellets in xylene at 140° C. The resulting homogeneous solution was then discharged into acetone solvent to remove antioxidant. The precipitated flake-like PP polymer was washed with acetone twice before drying in a vacuum oven at 50° C. for 24 hr.

In a 100 ml flask equipped with a stirrer, 10 g of the purified i-PP was suspended in 80 ml benzene at 25° C. under nitrogen, whereafter 2.5 g maleic anhydride (MA) and 1.1 g tributylborane (TBB) were added. After stirring the mixture for 10 minutes, 390 ml of oxygen were introduced into the reactor over a period of 3 hours. The reaction was stirred for another 3 hours at 25° C. before precipitating the reaction mixture into 200 ml acetone. The maleic anhydride modified polymer was isolated by filtration, washed with acetone four times, and dried under vacuum at 50° C. for 24 hr. FTIR spectrum showed that the maleic anhydride modified i-PP polymer (PP-MA) contained 0.4 weight % of maleic anhydride units. The intrinsic viscosity of PP-MA indicated the average molecular weight (Mv) was about 270,000 g/mole, i.e., that the molecular weight was about the same before and after the modification. Differential scanning calorimetry (DSC) also showed no change in melting temperature, Tm~162° C.

EXAMPLE 5

Maleation Reaction of Commercial Isotactic Polypropylene (Pellet-form)

Following the procedures generally described in Example 4, 3 g of the purified i-PP was swelled in 15 ml biphenyl at 125° C. under nitrogen in a 50 ml flask equipped with a stirrer and a condenser. To the solution, 0.9 g maleic anhydride and 0.22 g tributylborane were added. After stirring the mixture for 10 minutes, 78 ml of oxygen was introduced into the reactor over a period of 3 hours. The reaction was stirred for another 3 hours at 125° C. before precipitating the reaction mixture into 100 ml acetone. The maleic anhydride modified polymer was isolated by filtration, washed with acetone four times, and dried under vacuum at 50° C. for 24 hr. FTIR spectrum showed the maleic anhydride modified i-PP polymer (PP-MA) contained 0.6 weight % of maleic anhydride units. The intrinsic viscosity of PP-MA indicated the average molecular weight (Mv) to be about 154,000 g/mole. Differential scanning calorimetry (DSC) showed melting temperature, Tm~162° C.

EXAMPLE 6

Maleation Reaction of Commercial Isotactic Polypropylene (Pellet-form)

Following the general procedures described in Example 4, 3 g of the purified i-PP was dissolved in 15 ml biphenyl at 140° C. under nitrogen in a 50 ml flask equipped with a stirrer and a condenser. To the homogeneous solution, 0.9 g maleic anhydride and 0.22 g tributylborane were added. After stirring the mixture for 10 minutes, 78 ml of oxygen was introduced into the reactor over a period of 3 hours. The reaction was stirred for another 3 hours at 140° C. before precipitating the reaction mixture into 100 ml acetone. The maleic anhydride modified polymer was isolated by filtration, washed with acetone four times, and dried under vacuum at 50° C. for 24 hr. FTIR spectrum showed the maleic anhydride modified i-PP polymer (PP-MA) contained 0.8 weight % of maleic anhydride units. The intrinsic viscosity of PP-MA indicated the average molecular weight (Mv) to be about 136,000 g/mole. Differential scanning calorimetry (DSC) showed melting temperature, Tm~162° C.

EXAMPLE 7

Maleation Reaction of Isotactic Polypropylene with Step-wise Procedure

In this example, focus was on a step-wise addition procedure of trialkylborane and oxygen and to understanding its effects on the PP-MA structure. In a 50 ml flask equipped with a stirrer, 3 g of the purified i-PP (described in Example 4) and 0.9 g of maleic anhydride were mixed in 15 ml biphenyl at 140° C. under nitrogen, whereafter 0.07 g tributylborane (1/3 of the total amount to be added) was introduced into the solution. After stirring the mixture for 10 minutes, 26 ml of oxygen (1/3 or the total amount to be added) was introduced into the reactor. The reaction solution was stirred at 140° C. for 1 hour before adding a second portion of tributylborane (another 0.07 g) and then oxygen (another 26 ml). After another 1 hour at 140° C., the last portion of tributylborane (the final 0.07 g) and oxygen (the final 26 ml) were added. The reaction was carried out for another 3 hours at 140° C. before precipitating the reaction mixture into 100 ml acetone. The maleic anhydride modified polymer was isolated by filtration, washed with acetone four times, and dried under vacuum at 50° C. for 24 hr. FTIR spectrum showed the maleic anhydride modified i-PP polymer (PP-MA) contained 1.3 weight % of maleic anhydride units. The intrinsic viscosity of PP-MA indicated the average molecular weight (Mv) was about 70,000 g/mole. Differential scanning calorimetry (DSC) showed melting temperature, Tm~161° C.

EXAMPLE 8

Maleation Reaction of Isotactic Polypropylene (Powder-form)

A powder-form antioxidant-free isotactic polypropylene (i-PP) having a molecular weight (Mv) of about 117,000 g/mole and a melting temperature of about 161° C. was directly used without purification. In a 50 ml flask equipped with a stirrer and a condenser, 3 g of the i-PP was swelled in 15 ml biphenyl at 125° C. under nitrogen. To the swelled solution, 0.9 g maleic anhydride and 0.22 g tributylborane were added. After stirring the mixture for 10 minutes, 78 ml of oxygen was introduced into the reactor over a period of 3 hours. The reaction was stirred for another 3 hours at 125° C. before precipitating the reaction mixture into 100 ml acetone. The maleic anhydride modified polymer was isolated by filtration, washed with acetone four times, and dried under vacuum at 50° C. for 24 hr. FTIR spectrum showed the maleic anhydride modified i-PP polymer (PP-MA) containing 0.9 weight % of maleic anhydride units. The intrinsic viscosity of PP-MA indicated the average molecular weight (Mv) about 66,000 g/mole. Differential scanning calorimetry (DSC) showed melting temperature, Tm~161° C.

EXAMPLE 9

Maleation Reaction of Isotactic Polypropylene (Spherical Particle)

An antioxidant-free isotactic polypropylene (i-PP) having a spherical particle shape (about 1–2 mm diameter), a molecular weight (Mv) of about 218,000 g/mole, and melting temperature of about 164° C. was directly used without purification. In a 50 ml flask equipped with a stirrer and a condenser, 3 g of the i-PP was dissolved in 10 ml biphenyl at 140° C. under nitrogen To the solution, 0.9 g maleic anhydride and 0.22 g tributylborane were added. After stirring the mixture for 10 minutes, 78 ml of oxygen was introduced into the reactor over a period of 3 hours. The reaction was stirred for another 3 hours at 140° C. before precipitating the reaction mixture into 100 ml acetone. The maleic anhydride modified polymer was isolated by filtration, washed with acetone four times, and dried under vacuum at 50° C. for 24 hr. FTIR spectrum showed the maleic anhydride modified i-PP polymer (PP-MA) to contain 0.5 weight % of maleic anhydride units. The intrinsic viscosity of PP-MA indicated the average molecular weight (Mv) to be about 120,000 g/mole. Differential scanning calorimetry (DSC) showed melting temperature, Tm~164° C.

EXAMPLE 10

Maleation Reaction of Ethylene/Propylene Copolymer (Pellet-form)

A commercial pellet-form ethylene/propylene copolymer (EP), containing about 3 mole % ethylene and having a molecular weight (Mv) of about 217,000 g/mole and melting temperature of about 160° C., was purified by dissolving the polymer pellets in xylene at 140° C., and then discharging the homogeneous solution into acetone solvent to remove antioxidant. The precipitated polymer was washed with acetone twice before drying in a vacuum oven at 50° C. for 24 hr.

In a 100 ml flask equipped with a stirrer, 10 g of the purified EP was suspended in 80 ml benzene at 25° C. under nitrogen, whereafter 2.5 g maleic anhydride and 1.1 g tributylborane were added. After stirring the mixture for 10 minutes, 390 ml of oxygen was introduced into the reactor over a period of 3 hours. The reaction was stirred for another 3 hours at 25° C. before precipitating the reaction mixture into 200 ml acetone. The maleic anhydride modified polymer was isolated by filtration, washed with acetone four times, and dried under vacuum at 50° C. for 24 hr. FTIR spectrum showed that the maleic anhydride modified EP contained 0.8 weight % of maleic anhydride units. The intrinsic viscosity of PP-MA indicated the average molecular weight (Mv) to be about 200,000 g/mole, i.e., no change before and after modification. Differential scanning calorimetry (DSC) also showed no change in melting temperature, Tm~160° C.

EXAMPLE 11

Maleation Reaction of Poly(ethylene-co-p-methylstyrene)

In a 500 ml flask equipped with a stirrer, 20 g of poly(ethylene-co-p-methylstyrene), containing 1 mole % of p-methylstyrene units, Mw=120×10$^3$ g/mole and Mw/Mn= 2.2, was dissolved in 200 g biphenyl at 100° C. under nitrogen, followed by the addition of 2 g maleic anhydride (MA) and 1 g tributylborane (TBB). After stirring the mixture for 10 minutes, 380 ml of oxygen was introduced into the reactor over a period of 3 hours. The reaction was stirred for another 3 hours at 100° C. before precipitating the reaction mixture into 200 ml acetone. The maleic anhydride modified polymer was isolated by filtration, washed with acetone four times, and dried under vacuum at 50° C. for 24 hr. FTIR spectrum showed the maleic anhydride content in the polymer was about 1.3 weight %, which implied that most of p-methylstyrene units involved the MA graft reaction. The MA modified polymer was completely soluble in xylene at elevated temperature and showed similar intrinsic viscosity as the corresponding starting poly(ethylene-co-p-methylstyrene) copolymer, strongly indicating that there is no detectable crosslinking in the MA modified PE-p-MS copolymer.

EXAMPLE 12

Maleation Reaction of Syndiotactic Polystyrene (s-PS)

In a 200 ml flask equipped with a stirrer, 10 g of syndiotactic polystyrene (Tm=273° C.) was dissolved in 100 g biphenyl at 125° C. under nitrogen, followed by the addition of 2 g maleic anhydride (MA) and 0.9 g tributylborane (TBB). After stirring the mixture for 10 minutes, 360 ml of oxygen was introduced into the reactor over a period of 3 hours. The reaction was stirred for another 3 hours at 125° C. before precipitating the reaction mixture into 200 ml acetone. The maleic anhydride modified polymer was isolated by filtration, washed with acetone four times, and dried under vacuum at 50° C. for 24 hr. FTIR spectrum showed the maleic anhydride content in the s-PS polymer was about 1.8 weight %. There was no detectable crosslinking in the MA modified polymer.

The advantages of this invention will be apparent to those of skill in the art, and it is to be understood that this invention is not limited to the specific examples, which are merely illustrative, and that modifications may be made without departing from the invention as set forth in the claims.

What is claimed is:

1. A post-reactor modification process for preparing a maleic anhydride modified polyolefin, which comprises:
   (a) mixing trialkylborane with maleic anhydride and polyolefin in an inert organic solvent at a temperature of from about 0 to about 150° C. to form a reaction mixture containing a trialkylborane-maleic anhydride complex;
   (b) contacting the reaction mixture from step (a) with an oxygen-containing oxidizing agent over a period of from about 10 minutes to about 10 hours, at a temperature of from about 0 to about 150° C., and at a mole ratio of oxidizing agent to trialkylborane of from about 1/2 to about 4/3, so as to form a mono-oxidized trialkylborane adduct that undergoes hemolytic cleavage to form an alkoxy radical, said alkoxy radical, in turn, activating the chain of said polyolefin by alkoxy radical hydrogen-abstraction, and thereby initiating an addition reaction between said maleic anhydride and the activated polyolefin to produce a modified polyolefin having maleic anhydride side groups; and
   (c) recovering said modified polyolefin.

2. The process of claim 1, wherein said trialkylborane is a symmetric trialkylborane selected from the group consisting of triethylborane, tripropylborane, tributylborane, tripentylborane and trioctylborane.

3. The process of claim 1, wherein said trialkylborane is an asymmetric trialkylborane selected from the group consisting of alkyl-9-borabicyclononane, alkyldisiamylborane, alkyldiisopropinocampheylborane, alkyldicyclohexylborane, alkyl-2-methylcyclohexylborane, alkyl-3,5-dimethylborane, alkyl-dimesitylborane, and butyl-borafluorene, where alkyl is a $C_1$–$C_{10}$ alkyl group.

4. The process of claim 1, wherein said wherein said oxidizing agent is selected from the group consisting of oxygen and organic peroxides and hydroperoxides.

5. The process of claim 4, wherein said wherein said organic peroxide is selected from the group consisting of benzoyl peroxide, acetyl peroxide lauryl peroxide, t-butyl peracetate, cumyl peroxide, t-butyl peroxide, hyrdoperoxide and t-butyl hyrdoperoxide.

6. The process of claim 1, wherein the mole ratio of oxidixing agent to trialkylborane is from about 9/10 to about 10/9.

7. The process of claim 1, wherein step (b) is performed at ambient temperature.

8. The process of claim 1, wherein said modified polymer is recovered by cooling the mixture obtained in step (b) to a temperature below about 50° C., followed by combining the mixture with a non-solvent for the modified polymer to precipitate said modified polymer, isolating said modified polymer by filtration, and then washing and drying said modified polymer.

9. The process of claim 1, wherein the mole ratio of polymer repeating units/trialkylborane present in step (a) is from about 10/1 to about 300/1, and the mole ratio of trialkylborane/maleic anhydride is from about 1/1 to about 1/100.

10. The process of claim 1, wherein the mole ratio of polymer repeating units/trialkylborane present in step (a) is from about 30/1 to about 200/1, and the mole ratio of trialkylborane/maleic anhydride is from about 1/2 to about 1/50.

11. The process of claim 1, wherein the mole ratio of polymer repeating units/trialkylborane present in step (a) is from about 50/1 to about 150/1, and the mole ratio of trialkylborane/maleic anhydride is from about 1/5 to about 1/20.

12. The process of claim 1, wherein the polyolefin to be modified is selected from the group consisting of homo-, co- or terpolymers of $C_2$–$C_{18}$ α-olefins having linear, branched, cyclic or aromatic vinyl structures.

13. The process of claim 1, wherein the polyolefin to be modified has been prepared by transition metal coordination polymerization at least one monomer selected from the group consisting of ethylene, propylene, 1-butene, 1-pentene, 1-hexene, 1-octene, 3-methyl-1-butene, 4-methyl-1-pentene, cyclopentene, nornomene, 5-methylnorbornene, 5-ethylnorbornene, 5-propylnorbornene, 5-phenylnorbornene, styrene, o-methylstyrene, p-methylstyrene, m-methylstyrene, 2,4-dimethylstyrene, 2,5-dimethylstyrene, 3,4-dimethylstyrene, 3,5-dimethylstyrene, p-chlorostyrene, m-chlorostyrene and o-chlorostyrene.

14. The process of claim 1, wherein the polyolefin to be modified has a molecular weight of at least about 500 g/mole, and said modified polyolefin has a concentration of incorporated maleic anhydride groups of from about 0.05 to about 5 mole % (versus olefin units in the polymer chain).

15. The process of claim 1, wherein the polyolefin to be modified has a molecular weight of from about 10,000 to about 3,000,000 g/mole, and said modified polyolefin has a concentration of incorporated maleic anhydride groups of from about 0.1 to about 3 mole % (versus olefin units in the polymer chain).

16. The process of claim 1, wherein the polyolefin to be modified has a molecular weight of from about 50,000 to about 1,000,000 g/mole, and said modified polyolefin has a concentration of incorporated maleic anhydride groups of from about 0.2 to about 1 mole % (versus olefin units in the polymer chain).

17. The process of claim 7, wherein the mole ratio of polymer repeating units/trialkylborane present in step (a) is from about 30/1 to about 200/1, and the mole ratio of trialkylborane/maleic anhydride is from about 1/2 to about 1/50.

18. The process of claim 7, wherein the mole ratio of polymer repeating units/trialkylborane present in step (a) is from about 50/1 to about 150/1, and the mole ratio of trialkylborane/maleic anhydride is from about 1/5 to about 1/20.

19. The process of claim 7, wherein the polyolefin to be modified has a molecular weight of from about 10,000 to about 3,000,000 g/mole, and said modified polyolefin has a concentration of incorporated maleic anhydride groups of from about 0.1 to about 3 mole % (versus olefin units in the polymer chain).

20. The process of claim 7, wherein the mole ratio of polymer repeating units/trialkylborane present in step (a) is from about 50/1 to about 150/1, and the mole ratio of trialkylborane/maleic anhydride is from about 1/5 to about 1/20.

* * * * *